United States Patent
Watson et al.

(10) Patent No.: US 9,958,699 B2
(45) Date of Patent: May 1, 2018

(54) HYBRID POLARIZING BEAM SPLITTER

(71) Applicant: 3M INNOVATIVE PROPERTIES COMPANY, St. Paul, MN (US)

(72) Inventors: Philip E. Watson, Saint Paul, MN (US); Yarn Chee Poon, Singapore (SG); Andrew J. Ouderkirk, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 14/135,703

(22) Filed: Dec. 20, 2013

(65) Prior Publication Data
US 2014/0176818 A1 Jun. 26, 2014

Related U.S. Application Data

(60) Provisional application No. 61/740,719, filed on Dec. 21, 2012.

(51) Int. Cl.
| | |
|---|---|
| *G02B 27/28* | (2006.01) |
| *H04N 9/31* | (2006.01) |
| *H04N 5/74* | (2006.01) |
| *G02F 1/1335* | (2006.01) |
| *G03B 21/20* | (2006.01) |

(52) U.S. Cl.
CPC ..... *G02B 27/283* (2013.01); *G02F 1/133528* (2013.01); *H04N 5/7441* (2013.01); *H04N 9/3167* (2013.01); *G03B 21/2073* (2013.01)

(58) Field of Classification Search
CPC .. G02B 27/283; H04N 9/3167; H04N 5/7441; G03B 21/2073; G02F 1/133528
USPC ........ 349/9, 96; 359/485.03, 485.05, 485.06, 359/489.06; 353/34, 81
See application file for complete search history.

(56) References Cited

U.S. PATENT DOCUMENTS

| | | |
|---|---|---|
| 3,202,039 A | 8/1965 | De Lang |
| 5,625,738 A | 4/1997 | Magarill |
| 5,882,774 A | 3/1999 | Jonza |
| 6,609,795 B2 | 8/2003 | Weber |
| 6,644,814 B2 | 11/2003 | Ogawa |
| 6,870,523 B1 | 3/2005 | Ben-David |
| 7,529,029 B2 | 5/2009 | Duncan |
| 7,821,713 B2 | 10/2010 | Magarill |
| 8,485,667 B2 | 7/2013 | Magarill |
| 2005/0168697 A1* | 8/2005 | Bruzzone et al. ............. 353/20 |
| 2006/0262514 A1 | 11/2006 | Conner |
| 2007/0115552 A1* | 5/2007 | Robinson et al. ........... 359/495 |
| 2007/0146639 A1 | 6/2007 | Conner |
| 2011/0007392 A1 | 1/2011 | English |
| 2011/0149547 A1 | 6/2011 | Bruzzone |
| 2012/0008096 A1* | 1/2012 | Magarill et al. .............. 353/20 |
| 2014/0320822 A1 | 10/2014 | Carls |

OTHER PUBLICATIONS

Brennesholtz et al., "Projection Display"; Wiley-SID Series in Display Technology; pp. 96-99 (2008).

* cited by examiner

*Primary Examiner* — Dung Nguyen
(74) *Attorney, Agent, or Firm* — Robert S. Moshrefzadeh

(57) ABSTRACT

Polarizing beam splitters and systems incorporating such beam splitters are described. More specifically, hybrid polarizing beam splitters and systems with such beam splitters that incorporate polymeric reflective polarizers aligned with MacNeille or wire grid reflective polarizers are described.

27 Claims, 3 Drawing Sheets

HYBRID POLARIZING BEAM SPLITTER

FIELD

This disclosure generally relates to polarizing beam splitters such as those used in optical projectors.

BACKGROUND

A projection system typically includes a light source, one or more image forming components or imagers, projection optics, and potentially a screen. Often, imagers used in projection systems are polarization-rotating, image-forming devices, such as liquid crystal display imagers, which operate by rotating the polarization of the light to produce an image corresponding to digital video signals. Imagers used in projection systems typically rely on polarizers to separate light into a pair of orthogonal polarization states (e.g., s-polarization and p-polarization) before the light may be imaged. Therefore, projection systems will also generally include a polarizing beam splitter (PBS) to serve this purpose.

Due to new demands on PBSs, in part due to their new uses in applications such as, e.g., three-dimensional projection or ultra-compact projection systems that have relatively high light output, a number of new issues have arisen. The present application provides articles and systems that address such issues.

SUMMARY

In one aspect, the present description relates to an optical component including a first and second reflective polarizer arranged so that light having a first polarization state passes through each reflective polarizer and light having a second polarization state reflects from each reflective polarizer and where the first reflective polarizer is a polymeric reflective polarizer and the second reflective polarizer is a MacNeille reflective polarizer or a wire grid reflective polarizer. The polymeric reflective polarizer may contain alternating layers of polymeric film having different refractive indices. The second reflective polarizer may be a MacNeille polarizer made by depositing inorganic dielectric layers onto optical glass. In some embodiments, the first polarization state is a linear polarization state and the second polarization state may be a linear polarization state orthogonal to the first polarization state. An optically clear adhesive may be positioned between the first and second reflective polarizers. The optically clear adhesive may be a pressure sensitive adhesive. In one embodiment, the optical component is a pellicle component. In an alternative embodiment, the optical component contains a first and second prism with the first and second reflective polarizers between diagonal faces of the first and second prisms.

In another aspect, the present description relates to a system including the optical component described previously and further including a light source that directs light toward the optical component with light intercepting the first reflective polarizer at an angle of about 45 degrees. Light is reflected from the first reflective polarizer towards a polarization rotating reflector which reflects light back through the first and second reflective polarizer onto a reflective imager which images the light and reflects imaged light toward the second reflective polarizer. The imaged light intercepts the second reflective polarizer at an angle of about 45 degrees and exits the system. The polarization rotating reflector may include a broadband mirror and a quarter wave plate adjacent to the broadband mirror. The reflective imager may be a Liquid Crystal on Silicon (LCoS) imager. The effective pixel resolution of the imaged light may be less than 12 microns and may be less than 6 microns. The system may include a post-polarizer and/or a projection lens.

In another aspect, the present description relates to a system including the optical component described previously and further including a light source that directs light toward the optical component with light intercepting the first reflective polarizer at an angle of about 45 degrees. Light is reflected from the first reflective polarizer towards a reflective imager which images the light and reflects imaged light through the first and second reflective polarizer. The imaged light may pass through a projection lens before exiting the system.

In another aspect, the present description relates to a system including the optical component described previously and further including a light source that directs light toward the optical component with light intercepting the second reflective polarizer at an angle of about 45 degrees. Light is reflected from the second reflective polarizer towards a reflective imager which images the light and reflects imaged light through the second and first reflective polarizer. The imaged light may pass through a projection lens before exiting the system.

In another aspect, the present description relates to an optical component containing a first and second prism and containing a first and second reflective polarizer arranged so that light having a first polarization state passes through each reflective polarizer and light having a second polarization state reflects from each reflective polarizer. The first reflective polarizer is a polymeric reflective polarizer and the second reflective polarizer is a MacNeille reflective polarizer or a wire grid reflective polarizer. The first and second reflective polarizers are disposed between a first diagonal surface of the first prism and a second diagonal surface of the second prism. The second reflective polarizer may be a MacNeille polarizer made by depositing inorganic layers onto the second diagonal surface. In some embodiments, an optically clear adhesive may be positioned between the first reflective polarizer and the first prism and/or between the first reflective polarizer and the second reflective polarizer. The optically clear adhesive may be a pressure sensitive adhesive.

In another aspect, the present description relates to a system containing the optical component having prisms described previously and further including a light source that directs light toward the optical component with light intercepting the first reflective polarizer at an angle of about 45 degrees. Light is reflected from the first reflective polarizer towards a polarization rotating reflector which reflects light back through the first and second reflective polarizer onto a reflective imager which images the light and reflects imaged light toward the second reflective polarizer. The imaged light intercepts the second reflective polarizer at an angle of about 45 degrees and exits the system. The imaged light may pass through a projection lens before exiting the system. The effective pixel resolution of the imaged light may be less than 12 microns and may be less than 6 microns. The system may include a post-polarizer positioned adjacent to the second prism.

In another aspect, the present description relates to a system including the optical component having prisms described previously and further including a light source that directs light toward the optical component with light intercepting the second reflective polarizer at an angle of about 45 degrees. Light is reflected from the second reflective polarizer towards a reflective imager which images the light and reflects imaged light through the second and first reflective polarizer. The imaged light may pass through a projection lens before exiting the system.

BRIEF DESCRIPTION OF THE DRAWINGS

Throughout the specification reference is made to the appended drawings, wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
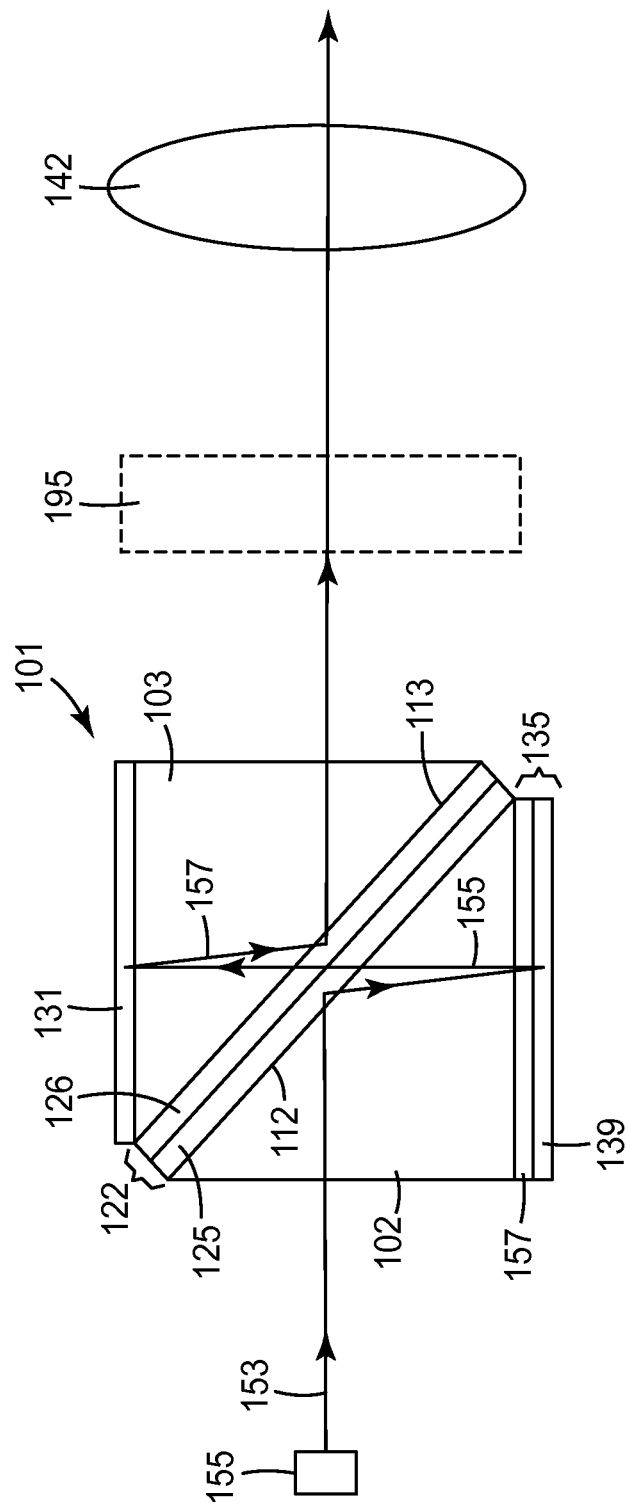
FIG. 1 illustrates a cross-sectional schematic of components used in an optical system.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

A high performance polarizing beam splitter (PBS) is essential for creating a viable optical engine for a projector that uses Liquid Crystal on Silicon (LCoS) imagers. In addition, a PBS may be required even for nominally unpolarized imagers such as DLP imagers when such imagers are required to image polarized light. Typically, a PBS will transmit nominally p-polarized light and reflect nominally s-polarized light. A number of different types of PBSs have been used in optical engines, including MacNeille type PBSs and wire grid polarizers. However, PBSs utilizing polymeric reflective polarizers have proven to be one of the most effective PBSs for issues associated with light handling in projection systems, including the ability to effectively polarize over a range of wavelengths and angles of incidence and with high efficiencies both in reflection and transmission. Such polymeric reflective polarizers may be multilayer optical films (MOF) made by 3M Company (St. Paul, Minn.), as described in U.S. Pat. No. 5,882,774 to Jonza et al., and U.S. Pat. No. 6,609,795 to Weber et al. Use of MOF based PBSs in optical engines results in significant improvements in both optical efficiency and in contrast compared with MacNeille type or wire grid PBSs.

With the advent of a number of new imaging and projection applications, including, e.g., three-dimensional projection and imaging, new challenges have arisen. Specifically, in at least some applications, it may be required that a PBS provide imaged light where the image quality is maintained not only when transmitted through a reflective polarizing film, but also when reflected by a reflective polarizing film. Unfortunately, polarizers based on multilayer optical film, despite their other major advantages, may be difficult to formulate with the requisite flatness to reflect imaged light with sufficiently low distortion. However, the concerns of effectively polarizing a wide array of angles of incident light and wavelengths of incident light must still be addressed. It would therefore be highly desirable to provide a polarizing beam splitter that has the benefits of a PBS that contains multilayer optical film, while also achieving low distortion for imaged light reflected off of the PBS towards a viewer or screen. In one aspect, the present description provides such a solution.

In another aspect, the present description provides a PBS having a long lifetime and providing a high contrast. When light interacts with a material, such as a polymeric reflective polarizer, it can cause damage that degrades the performance of the material. Experiments have shown that blue light causes the most damage in polymeric reflective polarizers and that the rate of damage caused by the blue light depends on the energy density of blue light incident on the polymeric reflective polarizer. The energy flux may be expressed in units of, for example, $W/mm^2$ and the total dose may be expressed in units of, for example, $MJ/mm^2$.

Accordingly, polymeric reflective polarizers used in polarizing beam splitters within projection systems degrade after a given amount of time. This degradation becomes far more rapid with higher intensity light sources, such that where two films have been exposed to equivalent doses of light ($MJ/mm^2$), the film that has been exposed to these doses at higher intensity will degrade more quickly. This degradation may generally cause a "yellowing" of the light that travels through or is reflected off of the reflective polarizer. In one aspect, the present description addresses this problem by providing a projection system that is capable of exposure to high intensity and doses of incident light while maintaining necessary performance over a longer lifetime and maintaining the high contrast ratio provided by MOF based PBSs.

FIG. 1 provides an illustration of one optical system according to the present description. Optical system includes an imager 131. In a number of embodiments, such as that illustrated in FIG. 1, the imager will be an appropriate reflective imager. Often, imagers used in projection systems are polarization-rotating, image-forming devices, such as liquid crystal display imagers, which operate by rotating the polarization of the light to produce an image corresponding to digital video signals. Such imagers, when used in projection systems, typically rely on polarizers to separate light into a pair of orthogonal polarization states (e.g., s-polarization and p-polarization) before light is incident upon the imager. Two common imagers that may be used in the embodiment shown in FIG. 1 include a liquid crystal on silicon (LCoS) imager, or digital light processing (DLP) imager. Those skilled in the art will recognize that the DLP system will require some modification to the illumination geometry as well as an external means of rotating the polarization (such as a retarder plate) in order to make use of the PBS configuration shown in FIG. 1.

The optical system in FIG. 1 also includes a polarizing beam splitter (PBS) 101. Within PBS 101 is a hybrid reflective polarizer 122 that includes a first reflective polarizer 125, which will generally be a polymeric reflective polarizer and a second reflective polarizer 126, which will typically be a MacNeille or wire grid polarizer. The polymeric reflective polarizer may be a multilayer optical film such as those available from 3M Company (St. Paul, Minn.) and described in, e.g., U.S. Pat. No. 5,882,774 to Jonza et al., and U.S. Pat. No. 6,609,795 to Weber et al., each of which is hereby incorporated by reference in its entirety. In the embodiment shown in FIG. 1, the PBS includes first prism 102 and second prism 103 on opposite sides of the hybrid reflective polarizer. The first reflective polarizer 125 of hybrid reflective polarizer 122 is positioned adjacent first diagonal surface 112 of first prism 102 and the second reflective polarizer 126 is positioned adjacent second diagonal surface 113 of second prism 103. A MacNeille reflective polarizer contains multiple inorganic dielectric layers. In one embodiment, reflective polarizer 126 is a MacNeille reflective polarizer made by depositing inorganic dielectric layers directly onto second diagonal surface 113 of second prism 103.

A reflective polarizer generally reflects light having a first polarization state and transmits light having a second polarization state. In hybrid PBS 101, the first (polymeric) reflective polarizer 125 and the second (MacNeille or wire grid) reflective polarizer 126 are disposed so that light having a first polarization state is reflected from both reflective polarizers 125, 126 and so that light have a second polarization state is transmitted through both reflective polarizers 125, 126. In some embodiments, the first polarization state is a linear polarization state and in some embodiments the second polarization state is a linear polarization state orthogonal to the first polarization state.

The optical system of FIG. 1 also includes a polarization rotating reflector 135. The polarization rotating reflector 135 may include a broadband mirror 139 and a retarder 137 positioned between the broadband mirror 139 and the first prism 102 (as illustrated in FIG. 1). Polarization rotating reflectors (such as element 135) are discussed elsewhere, for example, in U.S. Patent Application No. 2011/0007392 (English et al.), the relevant portions of which are hereby incorporated by reference. A polarization rotating reflector reverses the propagation direction of the light and alters the magnitude of the polarization components, depending on the components within the polarization rotating reflector and their orientation with respect to one another. The polarization rotating reflector may, in a number of embodiments, include a reflector and a retarder. In one embodiment, the reflector can be a broadband mirror that blocks the transmission of light by reflection. The retarder can provide any desired retardation, such as an eighth-wave retarder, a quarter-wave retarder, and the like. In embodiments described herein, there may be an advantage to using a quarter-wave retarder and an associated reflector. Linearly polarized light is changed to circularly polarized light as it passes through a quarter-wave retarder aligned at an angle of 45° with respect to the axis of light polarization. Reflections from the reflective polarizer and quarter-wave retarder/reflectors result in efficient light output from the PBS. In contrast, linearly polarized light is changed to a polarization state partway between s-polarization and p-polarization (either elliptical or linear) as it passes through other retarders and orientations, and can result in a lower efficiency of the PBS.

Referring to FIG. 1, light source 155, which may be a solid-state emitter such as a laser or a light emitting diode (LED) and may include a pre-polarizer (not shown), emits light 153 having an s-polarization state toward hybrid PBS 101. Light 153 passes through first prism 102, is incident upon first reflective polarizer 125 (here again, a polymeric reflective polarizer) at an angle of about 45 degrees, is reflected toward polarization rotating reflector 135, intercepts polarization rotating reflector 135 at an angle of about 90 degrees, and is then reflected back towards hybrid reflective polarizer 122 as p-polarized light 155. P-polarized light 155 passes through hybrid reflective polarizer 122, is incident on imager 131 at an angle of about 90 degrees, is imaged, and is reflected back towards the hybrid reflective polarizer 122 as s-polarized imaged light 157 (as the imager 131 rotates polarization state of the reflected light by 90 degrees). S-polarized light 157 intercepts the second polarizer 126 (a MacNeille or wire grid polarizer) at an angle of about 45 degrees, is reflected, intercepts optional post-polarizer 195 and projection lens 142 at an angle of about 90 degrees and exits the system. Optional post-polarizer 195 may be included to remove any p-polarized light that reflects from the hybrid reflective polarizer after reflecting from the imager in the off state.

Because imaged light 157 is reflected from a MacNeille or wire grid polarizer (second polarizer 126), any deviation from flatness of the MacNeille or wire grid polarizer would tend to distort the imaged light. A surface is said to be optically flat if it is sufficiently flat that images reflected from the surface are not significantly distorted. Fortunately, both MacNeille polarizers and wire grid polarizers are typically optically flat. This is typically not the case for MOF based reflective polarizers unless special techniques are used to make the MOF film optically flat, such as those techniques discussed in commonly owned and assigned U.S. Provisional Pat. App. No. 61/564,161. So if the MacNeille or wire grid polarizer 126 were removed from the PBS in FIG. 1, it would be difficult to achieve the desired low distortion image.

The deviation from optical flatness can be characterized by the effective pixel resolution of the PBS, which is defined as the maximum resolution that can be expected to be reliably (across 95% of the image) resolved after an image is reflected from the particular PBS. Most current imagers (LCoS and DLP) have a pixel size range from about 12.5 µm down to around 5 µm. So in order to be useful in a reflective imaging situation, it is desirable for the PBS be able to resolve down to at least about 12.5 µm, and ideally better. Therefore it is preferable that the effective pixel resolution of a PBS used in a reflective imaging situation be no more than about 12.5 µm, and preferably lower. This would be considered a high effective resolution. A method for measuring the effective resolution is described in U.S. Pat. App. No. 61/564,161, the relevant portions of which are hereby incorporated herein by reference. Conventional MacNeille or wire grid reflective polarizers are typically sufficiently optically flat that they are capable of reflecting light with an effective pixel resolution of less than 12 microns, less than 9 microns, or less than 6 microns.

To illustrate the contrast and efficiency benefits of the hybrid PBSs of the present disclosure, MOF and MacNeille reflective polarizers were modeled using the coefficients of reflection (Rs and Rp for s and p polarization, respectively) and the coefficients of transmission (Ts and Tp for s and p polarization, respectively) in Table I.

TABLE I

|    | MOF   | MacNeille |
|----|-------|-----------|
| Rs | 0.99  | 0.92      |
| Ts | 0.001 | 0.004     |
| Rp | 0.025 | 0.1       |
| Tp | 0.97  | 0.9       |

The efficiency of the system shown in FIG. 1 was estimated as $Rs^{(a)} Tp^{(a)} Tp^{(b)} Rs^{(b)}$ times 100% where the superscript (a) refers to the polymeric reflective polarizer 125 and the superscript (b) refers to the MacNeille or wire grid based reflective polarizer 126. For comparison, the efficiencies of single film reflective polarizers were estimated as Rs Tp Rs times 100%.

The contrast ratio for the system shown in FIG. 1 without a post-polarizer was estimated as the efficiency divided by the percentage of incident light transmitted through the system with the imager in the off state. For the hybrid reflective polarizer, this percentage was estimated as $Ts^{(a)} Ts^{(b)}+Rs^{(a)} Tp^{(a)} Tp^{(b)} Rp^{(b)}$ times 100%, where the first term accounts for incident s-polarized light that passes directly through the PBS and the second term accounts for p-polarized light that reflects from the reflective polarizer after being reflected from the imager in the off state. For a single film reflective polarizer, the corresponding percentage was estimated as Ts+Rs Tp Rp times 100%. For systems with a post polarizer, the percentage of incident light transmitted through the system with the imager in the off state was estimated as $Ts^{(a)} Ts^{(b)}$ times 100% for the hybrid reflective polarizer and estimated as Ts times 100% for a single film reflective polarizer. Table II shows the results of this analysis for a hybrid polarizer consisting of a MacNeille and an MOF based reflective polarizer and for MacNeille and MOF based reflective polarizers alone. From this table it can be seen that the hybrid reflective polarizer has a higher efficiency and a higher contrast than the MacNeille reflective polarizer. It can also be seen that when the post-polarizer is included, the hybrid PBS provides a higher contrast than either of the single reflective polarizer based PBSs.

TABLE II

|  | Hybrid | MacNeille Only | MOF Only |
|---|---|---|---|
| Efficiency | 80% | 76% | 95% |
| Contrast ratio without post-polarizer | 9.2 | 8.8 | 38 |
| Contrast ratio with post-polarizer | 199000 | 190 | 951 |

Figure 2:
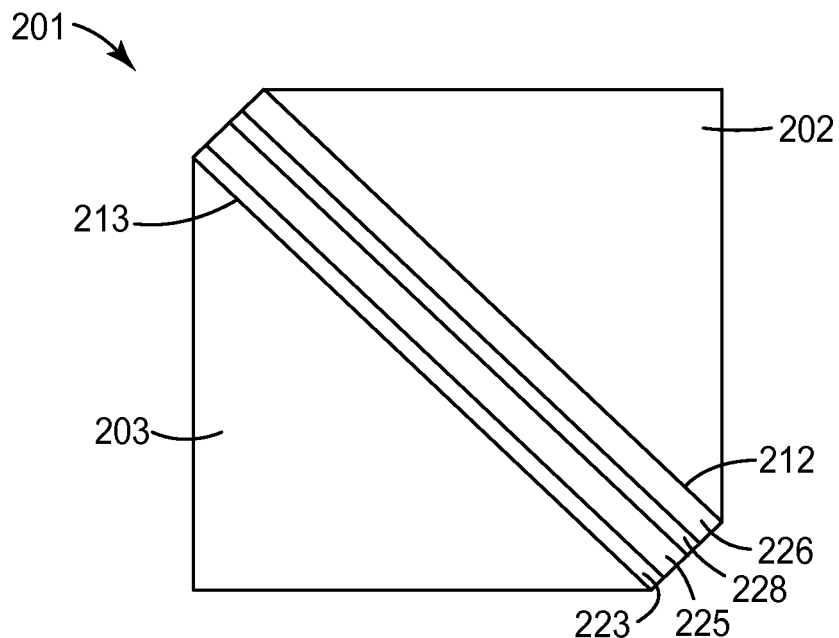
FIG. 2 illustrates a cross-sectional schematic of a polarizing beam splitter.

FIG. 2 shows a PBS according to one embodiment of the present description. The hybrid PBS 201 can be constructed by depositing dielectric layers 226 onto a first diagonal surface 212 of a first prism 202 and then laminating a first polymeric reflective polarizer 225 to the dielectric layers 226 using a first optically clear adhesive (OCA) layer 228. The dielectric layers 226 may act as a second reflective polarizer. A second prism 203 may be laminated to the polymeric reflective polarizer 225 opposite the first prism using a second OCA layer 223 adjacent second diagonal surface 213. The first or second prism, 202 or 203, may be constructed from optical glass or from a suitable plastic which may include polymethyl methacrylate (PMMA), cyclic olefins (CO), copolymers of PMMA and CO, and those materials discussed in commonly owned U.S. Pat. No. 7,529,029, column 16, lines 44-54. This section of U.S. Pat. No. 7,529,029 is hereby incorporated by reference. The OCA layers, 228 or 223, can be any suitable adhesive that does not significantly affect the transmission of visible light. The OCA layers, 228 or 223, may in some embodiments be pressure-sensitive adhesives. In other embodiments, the OCA layers, 228 or 223, may, without limitation, be photocurable adhesives or thermally-cured adhesives or two-part adhesives.

Figure 3:
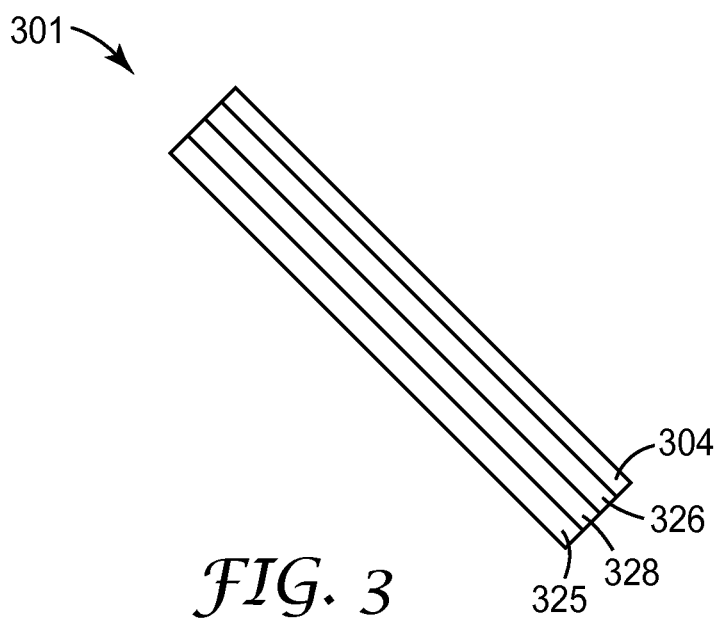
FIG. 3 illustrates a cross-sectional schematic of a polarizing beam splitter.

An alternative embodiment of the PBS of the present disclosure is the pellicle design shown in FIG. 3 where the hybrid PBS 301 is a free standing element rather than adhered or otherwise attached to and/or positioned between prisms. In this embodiment, inorganic dielectric layers 326 are deposited onto a substrate 304, which may be an optical glass. A first reflective polarizer 325 (in this case, a polymeric reflective polarizer) is then laminated to the dielectric layers 326 using an optically clear adhesive layer 328. In this embodiment, once again, the dielectric layers may act as a second reflective polarizer. The OCA layer 328 may be any of the OCAs previously described. In a prism design such as shown in FIGS. 1-2, it is in some cases desirable to apply an anti-reflective coating to the outer surfaces of the prisms in order to reduce reflection losses in the system. A pellicle design such as shown in FIG. 3, allows for a thinner PBS with less optical surface area for any anti-reflective coating that may be desired. Thus, in some cases, a pellicle design may be the most economical choice.

Figure 4:
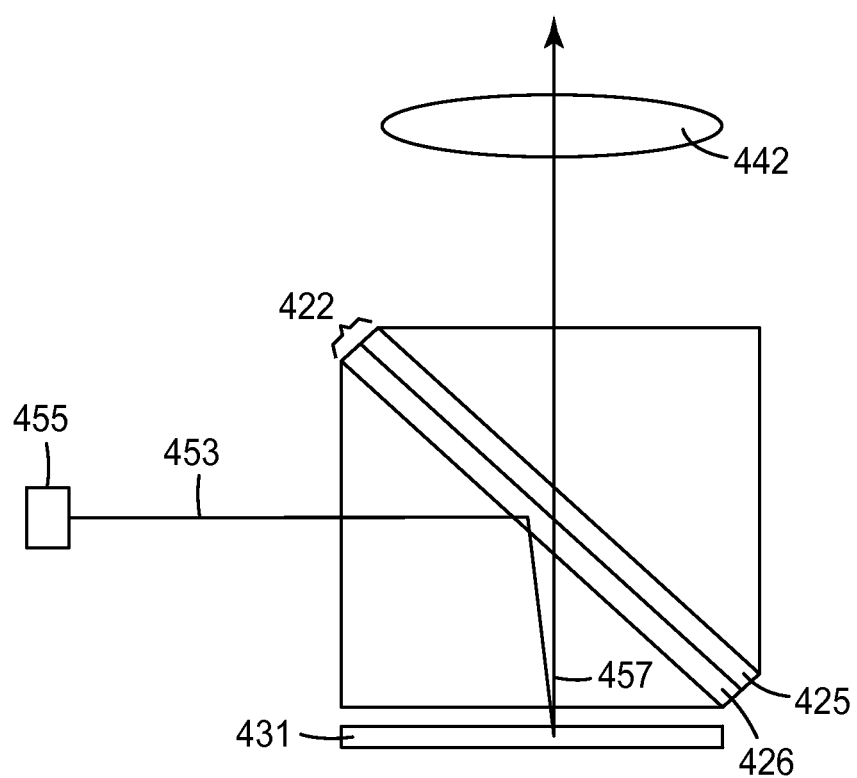
FIG. 4 illustrates a cross-sectional schematic of components used in an optical system.

As noted previously, the polymeric materials used in MOF based PBSs tend to degrade after extended use with high intensity light sources. FIG. 4 provides an illustration of one optical system according to the present description which addresses this problem. The highest intensity light in FIG. 4 is the s-polarized light 453 which is incident on the MacNeille or wire grid layer 426 of the hybrid reflective polarizer 422 at an angle of about 45 degrees. MacNeille or wire grid layer 426 may also be understood as a "second reflective polarizer." S-polarized light 453 is reflected from hybrid reflective polarizer 422 towards optical imager 431. S-polarized light 453 intercepts optical imager 431 at an angle of about 90 degrees, is imaged and is reflected toward hybrid reflective polarizer 422 as p-polarized imaged light 457, which passes through MacNeille or wire grid reflective polarizer (or second reflective polarizer) 426 and through polymeric reflective polarizer 425. Polymeric reflective polarizer 425 may also be understood for purposes of this description as a "first reflective polarizer." P-polarized imaged light 457 intercepts projection lens 442 at an angle of about 90 degrees and exits the system. The average intensity of the p-polarized imaged light 457 is significantly less than that of s-polarized light 453 since only the pixels in the "on-state" contribute to the p-polarized imaged light 457. The polymeric reflective polarizer 425 is exposed only to the relatively low intensity p-polarized imaged light 457 and thus has a higher lifetime than it would have without the MacNeille or wire grid polarizer 426.

The efficiency of the system shown in FIG. 4 was estimated as $Rs^{(a)} Tp^{(a)} Tp^{(b)}$ times 100% where here the superscript (a) refers to the MacNeille or wire grid based reflective polarizer (second reflective polarizer) 426 and the superscript (b) refers to the polymeric reflective polarizer (first reflective polarizer) 425. For comparison, the efficiency of single film reflective polarizers were estimated as Rs Tp times 100%.

Since the efficiency is the percentage of incident light transmitted through the system with the imager in the on state, the contrast for the system shown in FIG. 4 can be estimated as the efficiency divided by the percentage of incident light transmitted through the system with the imager in the off state. For the hybrid reflective polarizer, this percentage was estimated as $Rs^{(a)} Ts^{(a)} Ts^{(b)}$ times 100%. For a single film reflective polarizer, the corresponding percentage was estimated as Rs Ts times 100%.

Parameters from Table I were used to produce the results shown in the Table III. It can be seen that although the efficiency is slightly lower for the hybrid polarizer compared to the MacNeille polarizer, the contrast is much higher. For some applications, the high contrast of the hybrid polarizer combined with the higher lifetime of the hybrid polarizer compared to the MOF polarizer make the hybrid polarizer the preferred choice.

TABLE III

|  | Hybrid | MacNeille Only | MOF Only |
|---|---|---|---|
| Efficiency | 80% | 83% | 96% |
| Contrast ratio | 218000 | 225 | 960 |

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A system, comprising:
an optical component, comprising:
   a first reflective polarizer disposed to reflect light having a first polarization state and transmit light having a second polarization state different from the first polarization state; and
   a second reflective polarizer positioned adjacent the first reflective polarizer and disposed to reflect light having the first polarization state and transmit light having the second polarization state;
   wherein the first reflective polarizer is a polymeric reflective polarizer and the second reflective polarizer comprises inorganic dielectric layers or a wire grid;
a light source directing light towards the optical component, light from the light source intercepting the first reflective polarizer at an angle of about 45 degrees, wherein light intercepting the first reflective polarizer and having the first polarization state is reflected from the first reflective polarizer;
a polarization rotating reflector disposed such that the light reflected from the first reflective polarizer intercepts the polarization rotating reflector at an angle of about 90 degrees, the light being reflected back towards the first reflective polarizer and converted to the second polarization state; and,
a reflective imager disposed so that the light reflected from the polarization rotating reflector passes through the first and second reflective polarizers, intercepts the reflective imager at an angle of about 90 degrees, and is imaged;
   wherein imaged light is reflected from the reflective imager, intercepts the second reflective polarizer at an angle of about 45 degrees, is reflected and exits the system.

2. The system of claim 1, wherein the first reflective polarizer comprises alternating layers of polymeric film having different refractive indices.

3. The system of claim 1, wherein the second reflective polarizer comprises inorganic dielectric layers deposited onto optical glass.

4. The system of claim 1, wherein the first polarization state comprises a linear polarization state.

5. The system of claim 4, wherein the second polarization state comprises a linear polarization state orthogonal to the first polarization state.

6. The system of claim 1, further comprising an optically clear adhesive positioned between the first reflective polarizer and the second reflective polarizer.

7. The system of claim 6, wherein the optically clear adhesive is a pressure sensitive adhesive.

8. The system of claim 1, wherein the optical component comprises a pellicle component.

9. The system of claim 1, further comprising a first prism with a first diagonal surface positioned adjacent the first reflective polarizer opposite the second reflective polarizer and a second prism with a second diagonal surface positioned adjacent the second reflective polarizer opposite the first reflective polarizer.

10. The system of claim 1, wherein the polarization rotating reflector comprises a broadband mirror and quarter wave plate adjacent the broadband mirror.

11. The system of claim 1, wherein the reflective imager comprises an LCoS imager.

12. The system of claim 1, wherein the imaged light is directed towards a viewer with an effective pixel resolution of less than 12 microns.

13. The system of claim 12, wherein the imaged light is directed towards a viewer with an effective pixel resolution of less than 6 microns.

14. The system of claim 1, further comprising a post-polarizer positioned such that imaged light intercepts the post-polarizer at an angle of about 90 degrees after being reflected from the second reflective polarizer.

15. The system of claim 1, further comprising a projection lens positioned such that imaged light intercepts the projection lens at an angle of about 90 degrees after being reflected from the second reflective polarizer.

16. The system of claim 1, further comprising a projection lens positioned such that imaged light intercepts the projection lens at an angle of about 90 degrees after being transmitted through the second and first reflective polarizers.

17. A system comprising:
an optical component, comprising:
   a first prism having a first diagonal surface;
   a first reflective polarizer adjacent the first diagonal surface and disposed to reflect light having a first polarization state and transmit light having a second polarization state different from the first polarization state;
   a second reflective polarizer adjacent the first reflective polarizer opposite the first prism and disposed to reflect light having the first polarization state and transmit light having the second polarization state; and,
   a second prism having a second diagonal surface disposed so that the second diagonal surface is adjacent the second reflective polarizer opposite the first reflective polarizer;
   wherein the first reflective polarizer is a polymeric reflective polarizer and the second reflective polarizer comprises inorganic dielectric layers or a wire grid;
a light source emitting light towards the optical component, light from the light source intercepting the first reflective polarizer at an angle of about 45 degrees, wherein light intercepting the first reflective polarizer and having the first polarization state is reflected from the first reflective polarizer;
a polarization rotating reflector disposed adjacent the first prism so that the light reflected from the first reflective polarizer intercepts the polarization rotating reflector at an angle of about 90 degrees; the light being reflected towards the first reflective polarizer and converted to the second polarization state; and, a reflective imager disposed adjacent the second prism opposite the polarization rotating reflector so that the light reflected from the polarization rotating reflector passes through the first and second reflective polarizers and intercepts the reflective imager at an angle of about 90 degrees and is imaged;

wherein an imaged light is reflected from the reflective imager, intercepts the second reflective polarizer at an angle of about 45 degrees, is reflected and exits the system.

18. The system of claim 17, wherein the second prism comprises optical glass and the second reflective polarizer comprises inorganic dielectric layers deposited onto the second diagonal surface.

19. The system of claim 17, further comprising an optically clear adhesive positioned between the first reflective polarizer and the first prism.

20. The system of claim 19, wherein the optically clear adhesive comprises a pressure sensitive adhesive.

21. The system of claim 17, further comprising an optically clear adhesive positioned between the first reflective polarizer and the second reflective polarizer.

22. The system of claim 21, wherein the optically clear adhesive comprises a pressure sensitive adhesive.

23. The system of claim 17, further comprising a projection lens positioned such that imaged light intercepts the projection lens at an angle of about 90 degrees after being reflected from the second reflective polarizer.

24. The system of claim 17, wherein the imaged light is directed towards a viewer with an effective pixel resolution of less than 12 microns.

25. The system of claim 24, wherein the imaged light is directed towards a viewer with an effective pixel resolution of less than 6 microns.

26. The system of claim 17, further comprising a post-polarizer positioned adjacent the second prism opposite the first prism.

27. The system of claim 17, further comprising a projection lens positioned so that imaged light intercepts the projection lens at an angle of about 90 degrees after being transmitted through the first and second reflective polarizers.

* * * * *